United States Patent
Holdnack

(10) Patent No.: US 7,303,399 B1
(45) Date of Patent: Dec. 4, 2007

(54) INHIBITORY CONTROL ASSESSMENT AND ASSOCIATED METHODS

(75) Inventor: James A. Holdnack, Bear, DE (US)

(73) Assignee: Harcourt Assessment, Inc., San Antonio, TX (US)

( * ) Notice: Subject to any disclaimer, the term of this patent is extended or adjusted under 35 U.S.C. 154(b) by 96 days.

(21) Appl. No.: 11/233,882

(22) Filed: Sep. 23, 2005

(51) Int. Cl.
*G09B 19/00* (2006.01)
(52) U.S. Cl. ...................................... 434/236
(58) Field of Classification Search ................ 434/219, 434/236, 237, 258, 259, 322, 323, 335, 336, 434/350, 351, 353, 362; 600/300
See application file for complete search history.

(56) References Cited

U.S. PATENT DOCUMENTS

| | | | |
|---|---|---|---|
| 5,017,142 A * | 5/1991 | Bemis et al. ............... 434/220 |
| 5,724,987 A * | 3/1998 | Gevins et al. ............... 600/544 |
| 6,053,739 A | 4/2000 | Stewart et al. |
| 6,629,846 B2 * | 10/2003 | Poreh .......................... 434/236 |
| 6,884,078 B2 * | 4/2005 | Wiig et al. ................... 434/236 |
| 7,052,277 B2 * | 5/2006 | Kellman ...................... 434/118 |
| 7,087,015 B1 * | 8/2006 | Comrie et al. .............. 600/300 |
| 7,122,004 B1 * | 10/2006 | Cassily ........................ 600/300 |

* cited by examiner

*Primary Examiner*—Kurt Fernstrom
(74) *Attorney, Agent, or Firm*—Allen, Dyer, Doppelt, Milbrath & Gilchrist, P.A.

(57) ABSTRACT

An assessment of a subject's inhibitory control is provided that can be administered from an early age. Such skills can be used to predict early school adjustment and readiness. The test may also be used for nonreaders and students in special education, and in children down to the age of 5. The assessment tests for the ability to override an automatic response of naming colors and shapes. Each item in the assessment is administered by asking the subject to, for example, say "square" when looking at a circle.

10 Claims, 4 Drawing Sheets

INHIBITORY CONTROL ASSESSMENT AND ASSOCIATED METHODS

BACKGROUND OF THE INVENTION

1. Field of the Invention

The present invention relates to psychological assessment systems and methods, and, more particularly, to such systems and methods for assessing inhibitory control and self-regulation, for example, for diagnosing attention deficit disorder.

2. Description of Related Art

Executive functions can be described as "multiple processing modules collected together to direct cognitive activity, including mental functions associated with the ability to engage in purposeful, organized, strategic, self-regulated, goal-directed behavior." (George McCloskey, PhD, Philadelphia College of Osteopathic Medicine)

The "Stroop effect" is a psychological phenomenon exhibited by the automatic reading of words when printed letters form the word. The Stroop task requires that reading skills be overlearned and highly automatic, which limits the applicability of this task to children under 10 years of age and other individuals with reading difficulties.

Therefore, it would be advantageous to provide a test that does not depend upon strong reading skills to diagnose self-regulation deficits.

The currently known Stroop test also relies on only one item to determine if a child has problems with inhibitory control.

Therefore, it would be beneficial to provide an assessment comprising multiple items to create a composite score.

SUMMARY OF THE INVENTION

The present invention is directed to an assessment of a subject's inhibitory control from, for example, an early age. Such skills can be used to predict early school adjustment and readiness. The test may also be used for nonreaders and students in special education, and in children down to the age of 5.

The assessment of the present invention tests for the ability to override an automatic response of naming colors and shapes. Each item in the assessment is administered by asking the subject to, for example, say "square" when looking at a circle.

A method for assessing inhibitory control in a subject comprises the step of displaying to a subject an array of objects within a predefined class. Each object has one of a plurality of features within the predefined class, each of the features having an alternate feature thereof. The subject is directed to name, in order, each of the object features, and a time and an accuracy of subject naming of the object features is tracked.

The subject is next directed to name, in order, an alternate to each of the object features, and a time and an accuracy of subject naming of the alternate object features is tracked. The subject is also directed to name, in order, for a first subset of the objects, an alternate to each of the object features, and, for a second subset of the objects comprising objects not in the first subset, each of the object features. A naming time and an accuracy of subject naming of the first subset alternate features and of the second subset features are tracked.

Using the tracked namings, an inhibitory control of the subject is assessed.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1-4.

The assessment of the present invention includes a plurality of teaching examples and test pages. In a typical mode of administration, the test is provided bound in a spiral book, with the pages arranged so that the administration instructions are facing the test administrator and the test pages are facing the subject.

Figure 1:
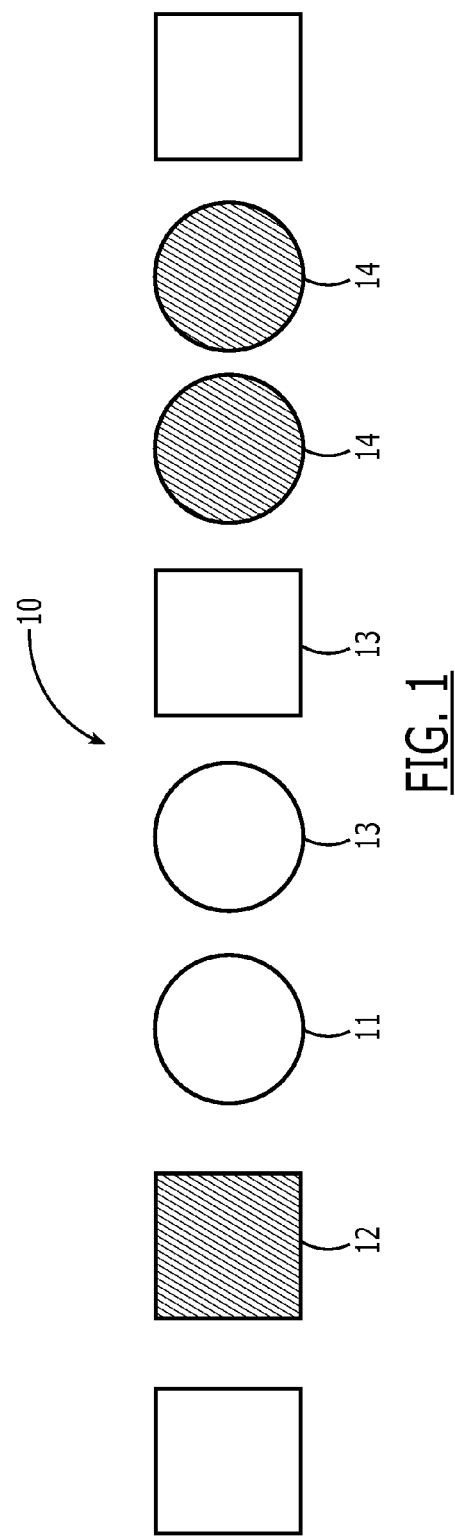
FIG. 1 is an exemplary first teaching example page.

An exemplary first set of teaching example items is administered using a page that displays a single row 10 of shapes, here, circles 11 and squares 12, that are open 13 or colored in 14, as illustrated in FIG. 1.

In a first condition, the test administrator asks the subject to name the shapes as quickly as possible without making mistakes. The test administrator may demonstrate the condition.

In a second condition, the subject is asked to name the shapes opposite to what they really are, for example, saying "square" for each circle and "circle" for each square.

In a third condition, the subject is asked to name the shape's correct shape if it is white, but the incorrect name when the shape is black.

Administration conditions may be imposed wherein, if the subject makes more than a predetermined number of errors, the item administration is halted.

Figure 2:
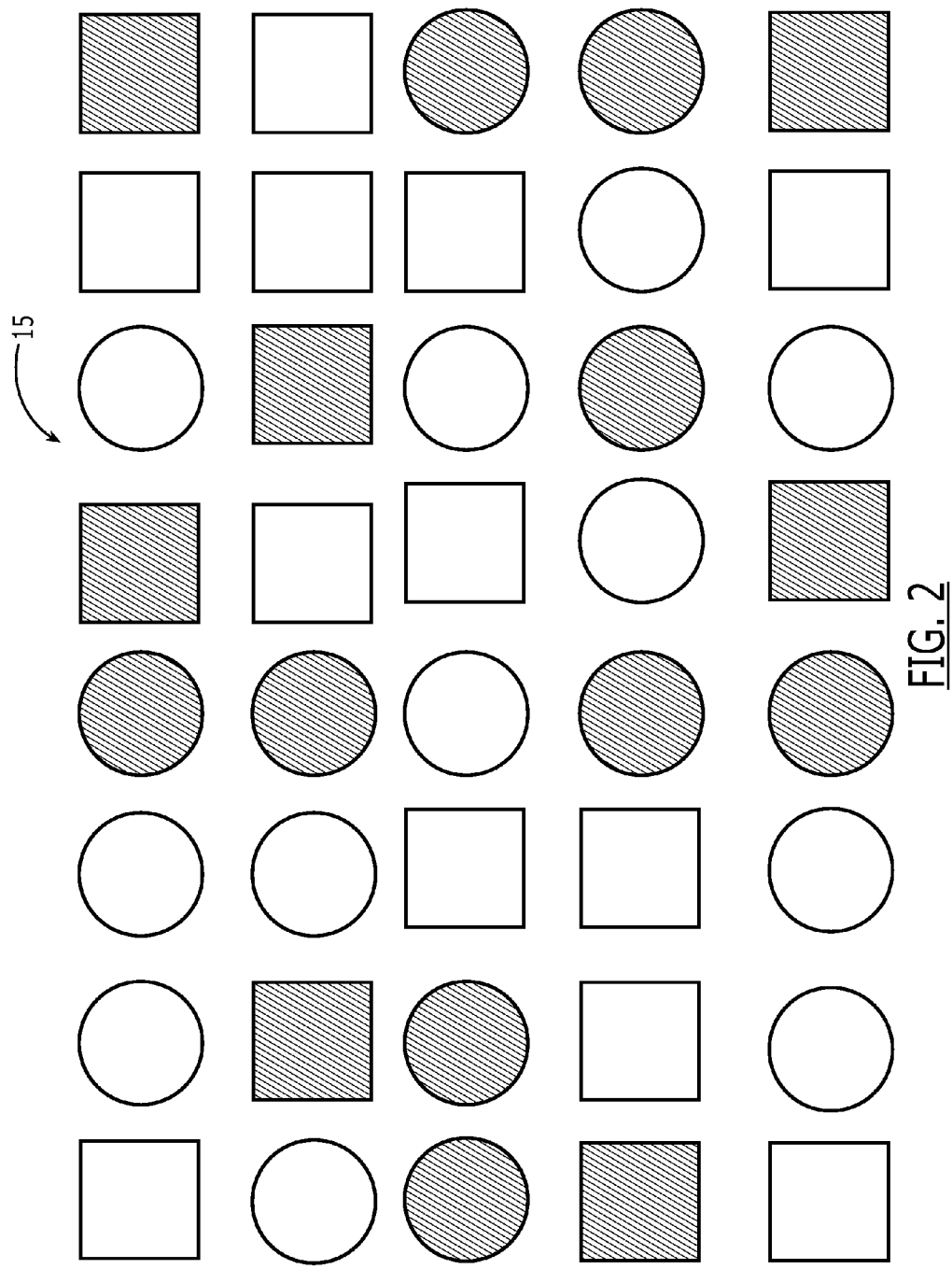
FIG. 2 is an exemplary first test page.

A next step in this exemplary assessment includes displaying a page 15 such as in FIG. 2, and repeating the same three conditions as above for the entire page of shapes.

Figure 3:
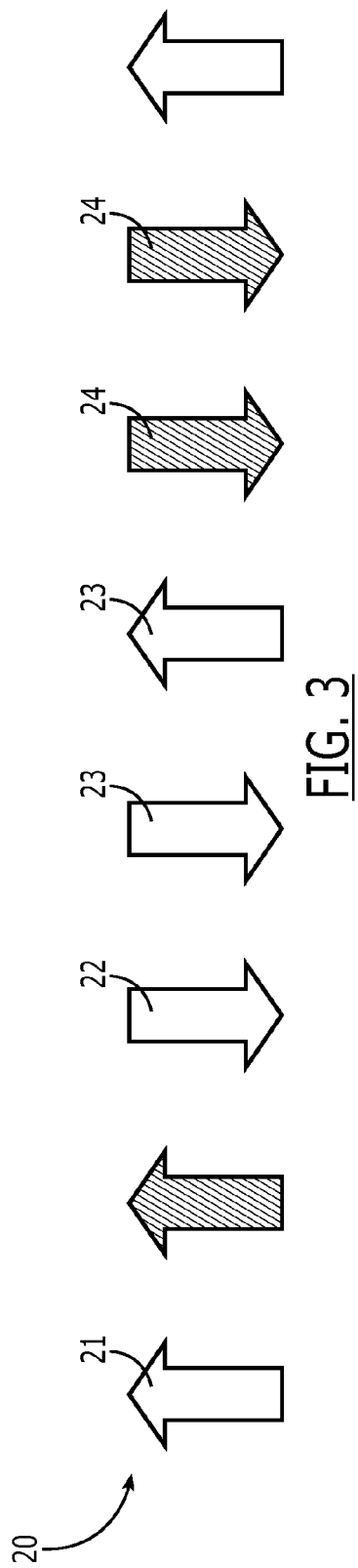
FIG. 3 is an exemplary second teaching example page.

An exemplary second set of teaching example items is administered using a page that displays a single row 20 of shapes, here, up 21 and down 22 arrows, that are open 23 or filled in 24, as illustrated in FIG. 3.

In a first condition, the test administrator asks the subject to name the arrow directions as quickly as possible without making mistakes. The test administrator may demonstrate the condition.

In a second condition, the subject is asked to name the directions opposite to what they really are, for example, saying "up" for each downward-pointing arrow and "down" for each upward-pointing arrow.

In a third condition, the subject is asked to name the shape's correct directionality if it is black, but the incorrect directionality when the arrow is white.

Figure 4:
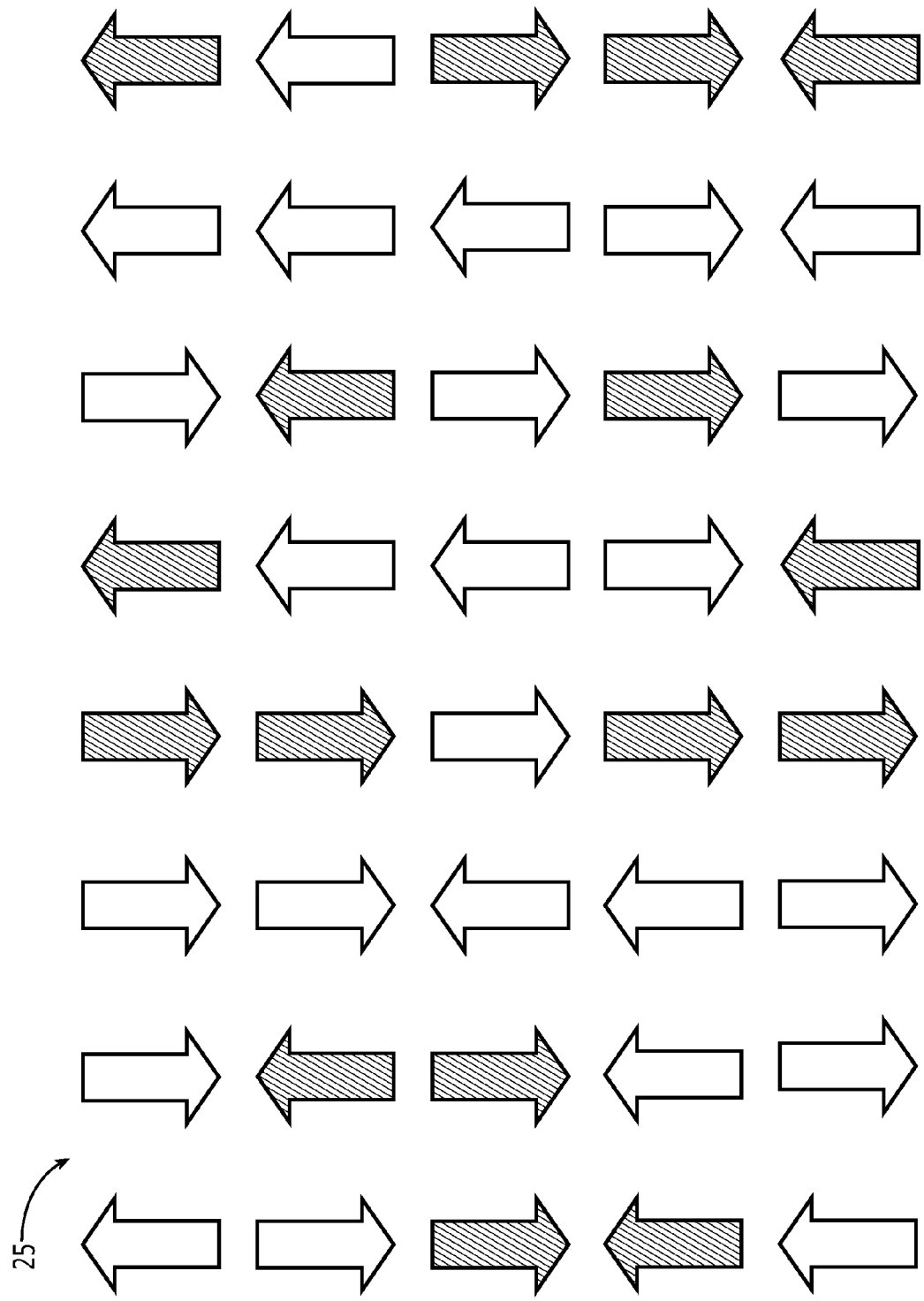
FIG. 4 is an exemplary second test page.

A next step in this exemplary assessment includes displaying a page 25 such as in FIG. 4, and repeating the same three conditions as above for the entire page of arrows.

As above, administration conditions may be imposed wherein, if the subject makes more than a predetermined number of errors, the item administration is halted.

In a particular example, 180 seconds are allowed for condition 1 and 240 seconds for testing conditions 2 and 3, for both items 1 and 2.

The subject's inhibitory control may be assessed, for example, by comparing the tracked naming times and accuracies with a normed grid of naming times and accuracies.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method for assessing inhibitory control in a subject comprising the steps of:
    displaying to a subject an array of objects within a predefined class, each object having one of a plurality of features within the predefined class, each of the features having an alternate feature thereof;
    directing the subject to name, in order, each of the object features;
    tracking a time and an accuracy of subject naming of the object features;
    directing the subject to name, in order, an alternate to each of the object features;
    tracking a time and an accuracy of subject naming of the alternate object features;
    directing the subject to name, in order, for a first subset of the objects, an alternate to each of the object features, and, for a second subset of the objects comprising objects not in the first subset, each of the object features;
    tracking a naming time and an accuracy of subject naming of the first subset alternate features and of the second subset features; and
    using the tracked namings and times, assessing an inhibitory control of the subject.

2. The method recited in claim 1, wherein the array of objects comprise an array of two types of shapes, the object features comprise the shape names, and the alternate features comprise an alternate to the shape names.

3. The method recited in claim 2, wherein the objects comprise circles and squares.

4. The method recited in claim 2, wherein the objects further are defined by one of two colors, objects of a first color comprising the first subset and objects of a second color comprising the second subset.

5. The method recited in claim 1, wherein the array of objects comprise an array of arrows pointing in one of two directions, the object features comprise the arrow directionalities, and the alternate features comprise an alternate to the arrow directionalities.

6. The method recited in claim 5, wherein the objects comprise arrows pointing upward and downward.

7. The method recited in claim 5, wherein the arrows further are defined by one of two depictions, objects of a first depiction comprising the first subset and objects of a second depiction comprising the second subset.

8. The method recited in claim 7, wherein the first depiction comprises open arrows and the second depiction comprises filled-in arrows.

9. The method recited in claim 1, further comprising the step of, if the subject makes more than a predetermined number of errors, halting the assessment.

10. The method recited in claim 1, wherein the inhibitory control assessing step comprises comparing the tracked naming times and accuracies with a normed grid of naming times and accuracies.

* * * * *